(12) United States Patent
Johnson et al.

(10) Patent No.: US 11,873,997 B2
(45) Date of Patent: Jan. 16, 2024

(54) OVEN APPLIANCE AND METHODS FOR HIGH-HEAT COOKING

(71) Applicant: Haier US Appliance Solutions, Inc., Wilmington, DE (US)

(72) Inventors: Eric Scott Johnson, Louisville, KY (US); Hans Juergen Paller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 832 days.

(21) Appl. No.: 16/915,313

(22) Filed: Jun. 29, 2020

(65) Prior Publication Data
US 2021/0404745 A1   Dec. 30, 2021

(51) Int. Cl.
| | |
|---|---|
| F24C 7/08 | (2006.01) |
| A21B 1/02 | (2006.01) |
| A21B 1/40 | (2006.01) |
| F24C 3/12 | (2006.01) |
| A23L 5/10 | (2016.01) |
| F24C 5/16 | (2006.01) |
| F24C 5/06 | (2021.01) |

(52) U.S. Cl.
CPC ............... *F24C 7/085* (2013.01); *A21B 1/02* (2013.01); *A21B 1/40* (2013.01); *A23L 5/15* (2016.08); *A23V 2002/00* (2013.01); *F24C 3/128* (2013.01); *F24C 5/06* (2013.01)

(58) Field of Classification Search
None
See application file for complete search history.

(56) References Cited

U.S. PATENT DOCUMENTS

| | | | | |
|---|---|---|---|---|
| 2,035,767 A * | 3/1936 | Schulze | ................. | F24C 7/087 219/486 |
| 2,385,433 A * | 9/1945 | Weber | ..................... | F24C 7/085 219/486 |
| 2,385,434 A * | 9/1945 | Weber | ....................... | F24C 7/08 219/486 |
| 2,402,787 A * | 6/1946 | Stickel | ..................... | F24C 7/08 219/412 |
| 2,404,139 A * | 7/1946 | McCormick | ............. | F24C 7/08 219/487 |
| 2,434,467 A * | 1/1948 | McCormick | ............. | F24C 7/08 219/486 |
| 2,483,526 A * | 10/1949 | Candor | ..................... | F24C 7/08 99/333 |
| 2,487,037 A * | 11/1949 | Smith | ..................... | H01H 37/56 219/508 |
| 2,732,476 A * | 1/1956 | Smith | ................... | H05B 1/0263 219/511 |

(Continued)

FOREIGN PATENT DOCUMENTS

| | | | | |
|---|---|---|---|---|
| CN | 204795645 U | 11/2015 | | |
| EP | 2333420 A1 * | 6/2011 | ............... | F24C 7/06 |

(Continued)

*Primary Examiner* — Jorge A Pereiro
(74) *Attorney, Agent, or Firm* — Dority & Manning, P.A.

(57) ABSTRACT

Methods for operating an oven appliance, as provided herein, may include various steps for activating top and bottom heating elements (e.g., at overlapping times) prior to limiting activation of one of the heating elements based on one or more received temperature signals.

16 Claims, 13 Drawing Sheets

(56) References Cited

U.S. PATENT DOCUMENTS

| | | | | |
|---|---|---|---|---|
| 2,745,937 A * | 5/1956 | Welch | ............... | F24C 7/087 |
| | | | | 219/397 |
| 3,073,938 A * | 1/1963 | Turner | ............... | H05B 1/0213 |
| | | | | 337/87 |
| 3,143,638 A * | 8/1964 | Scott | ............... | F24C 7/087 |
| | | | | 312/330.1 |
| 3,358,122 A | 12/1967 | Torrey | | |
| 3,364,338 A * | 1/1968 | Holtkamp | ............... | H05B 1/0213 |
| | | | | 219/412 |
| 3,828,163 A * | 8/1974 | Amagami | ............... | H05B 3/0076 |
| | | | | 219/408 |
| 4,164,643 A * | 8/1979 | Peart | ............... | F24C 7/046 |
| | | | | 426/243 |
| 4,429,829 A * | 2/1984 | Dutton | ............... | G05D 23/1917 |
| | | | | 236/46 F |
| 4,598,691 A * | 7/1986 | Herrelko | ............... | F24C 3/087 |
| | | | | 126/41 R |
| 5,296,683 A * | 3/1994 | Burkett | ............... | G05D 23/1934 |
| | | | | 219/412 |
| 5,317,130 A * | 5/1994 | Burkett | ............... | G05D 23/1951 |
| | | | | 219/486 |
| 5,352,865 A * | 10/1994 | Burkett | ............... | G05D 23/1951 |
| | | | | 219/486 |
| 5,695,668 A | 12/1997 | Boddy | | |
| 6,080,972 A * | 6/2000 | May | ............... | A21B 1/02 |
| | | | | 219/486 |
| 6,307,185 B1 * | 10/2001 | Loveless | ............... | F24C 7/10 |
| | | | | 219/400 |
| 6,570,136 B1 * | 5/2003 | Lockwood | ............... | F24C 7/082 |
| | | | | 219/412 |
| 6,777,652 B2 * | 8/2004 | Stockley | ............... | A47J 37/0641 |
| | | | | 219/486 |
| 6,987,252 B2 | 1/2006 | Goodrich | | |
| 7,378,617 B1 * | 5/2008 | Brockman | ............... | F24C 7/087 |
| | | | | 99/330 |
| 8,929,724 B1 * | 1/2015 | Mograbi | ............... | F24C 7/065 |
| | | | | 219/486 |
| 9,021,942 B2 * | 5/2015 | Lee | ............... | F24C 15/2007 |
| | | | | 219/757 |
| 9,404,660 B1 * | 8/2016 | Karabin | ............... | F24C 3/006 |
| 10,012,392 B2 | 7/2018 | Froelicher et al. | | |
| 10,368,395 B1 * | 7/2019 | Norman | ............... | H05B 1/0266 |
| 10,893,776 B1 * | 1/2021 | Norman | ............... | A47J 37/0611 |
| 2002/0092842 A1 * | 7/2002 | Loveless | ............... | F24C 7/10 |
| | | | | 219/400 |
| 2004/0149722 A1 | 8/2004 | Schnell et al. | | |
| 2005/0224064 A1 * | 10/2005 | Stockley | ............... | F24C 15/16 |
| | | | | 126/21 R |
| 2006/0090741 A1 * | 5/2006 | Bowles | ............... | F24C 15/322 |
| | | | | 126/41 R |
| 2008/0149089 A1 * | 6/2008 | Karabin | ............... | F24C 3/006 |
| | | | | 126/21 R |
| 2008/0237212 A1 * | 10/2008 | Blackson | ............... | F24C 7/087 |
| | | | | 219/398 |
| 2015/0104753 A1 * | 4/2015 | Cadima | ............... | F24C 3/128 |
| | | | | 432/51 |
| 2015/0370267 A1 * | 12/2015 | Boedicker | ............... | F24C 7/087 |
| | | | | 432/36 |
| 2016/0220057 A1 * | 8/2016 | Smith | ............... | H05B 3/0076 |
| 2016/0345767 A1 * | 12/2016 | Cadima | ............... | A23L 5/15 |
| 2017/0089590 A1 | 3/2017 | Bruin-Slot et al. | | |
| 2017/0130968 A1 | 5/2017 | Nagraj | | |
| 2017/0276375 A1 * | 9/2017 | Johnson | ............... | F24C 7/088 |
| 2018/0003390 A1 | 1/2018 | Trice et al. | | |
| 2018/0020680 A1 * | 1/2018 | Froelicher | ............... | F24C 15/32 |
| | | | | 126/21 A |
| 2020/0063973 A1 * | 2/2020 | Hensley | ............... | F24C 7/081 |
| 2020/0182484 A1 * | 6/2020 | Cowan | ............... | F24C 15/2014 |

FOREIGN PATENT DOCUMENTS

| | | |
|---|---|---|
| EP | 2251609 B1 | 8/2017 |
| JP | H10205776 A * | 8/1998 |
| JP | 2010112664 A | 5/2010 |

* cited by examiner

OVEN APPLIANCE AND METHODS FOR HIGH-HEAT COOKING

FIELD OF THE INVENTION

The present subject matter relates generally to oven appliances, and more particularly, to methods of operating an oven appliance for localized, high-heat cooking.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and a separate broiler heating assembly positioned at a top of the cooking chamber.

Typically, food or utensils for cooking are placed on wire racks within the cooking chamber and above the bake heating assembly. In some instances, protective or radiant plates are positioned over the bake heating assembly to protect the bake heating assembly or assist in evenly distributing heat across the bottom of the cooking chamber. Oftentimes, the wire racks are at least mounted well above a bake heating assembly to ensure the bake heating assembly is not damaged or a user does not accidentally contact the bake heating assembly. When the bake heating assembly is activated, heat from the bake heating assembly is thus forced to rise through an air gap, and any other intermediate elements, between the bake heating assembly and the wire rack before the utensil on the wire rack can be heated. Heat is within the cooking chamber is relatively diffuse, and the temperature is generally consistent about the item or items on the rack.

Although these conventional configurations are useful for many types of foods, there are certain disadvantages. For instance, certain food items, such as pizzas or breads, may benefit from very high, localized (i.e., non-diffuse) heat for a relatively short amount of time. Some such cooking operations are commonly referred to as short-cycle cooking operations. Oftentimes, stone or specialized high-heat pans are used for trapping heat against the bottom of flat-breads or pizza. Such pans may be difficult to preheat or maintain a specific temperature desired by the user. Although placing a pan closer to a heating element may help heat the pan faster or to a higher temperature, this may cause the pan or trapped heat to damage portions of the oven appliance. Moreover, trapping or localizing heat too much may lead to burning certain portions of a food item, without sufficiently cooking the rest.

Additionally or alternatively, problems may arise from attempts to heat one region or article to a relatively high temperature. For instance, the rest of the oven chamber may become excessively hot. Opening an oven door, in particular, may quickly release such excessive heat, which can be uncomfortable for a nearby user. Furthermore, damage may be caused to certain portions of the appliance.

Certain problems may be exacerbated by cooking multiple items in relatively quick succession. For instance, if a user attempts to cook multiple items, one right after the other, trapped heat may cause the later-cooked items to reach certain internal temperatures faster or at a different rate than the earlier-cooked items. This can result in inconsistent or unsuitable (e.g., burned) food items. As a result, typical cooking appliances require all heating elements to completely deactivate while the cooking chamber is allowed to cool significantly (e.g., to within 100° Fahrenheit of the ambient temperature).

Accordingly, it would be advantageous to provide an oven appliance or methods for safely generating high heat on a specific cooking surface within the oven appliance without unduly trapping heat or causing damage to the oven appliance or cooking surface. Additionally or alternatively, it would be advantageous to provide an oven appliance or methods for consistently cooking separate items at a high heat and in quick succession (e.g., without requiring the oven to completely deactivate or return to a temperature near the ambient temperature).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a cooking appliance is provided. The method may include initiating preheat activation of a bottom heating element and initiating preheat activation of a top heating element during preheat activation of the bottom heating element. The method may further include receiving one or more temperature signals from a first temperature sensor at the cooking surface and a second temperature sensor mounted above the first temperature sensor, the receiving occurring during the preheat activation of the bottom heating element and the preheat activation of the top heating element. The method may still further include determining a preheat threshold is met based on the received one or more temperature signals. The method may yet further include directing the bottom heating element and the top heating element according to a cooking cycle subsequent to determining the preheat threshold is met.

In another exemplary aspect of the present disclosure, a method of operating a cooking appliance is provided. The method may include initiating cooking activation of a bottom heating element and initiating high-output activation of a top heating element during cooking activation of the bottom heating element. The method may further include determining a restriction condition subsequent to initiating high-output activation of the top heating element. The method may still further include restricting, in response to determining the restriction condition, heat output at the top heating element during cooking activation of the bottom heating element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
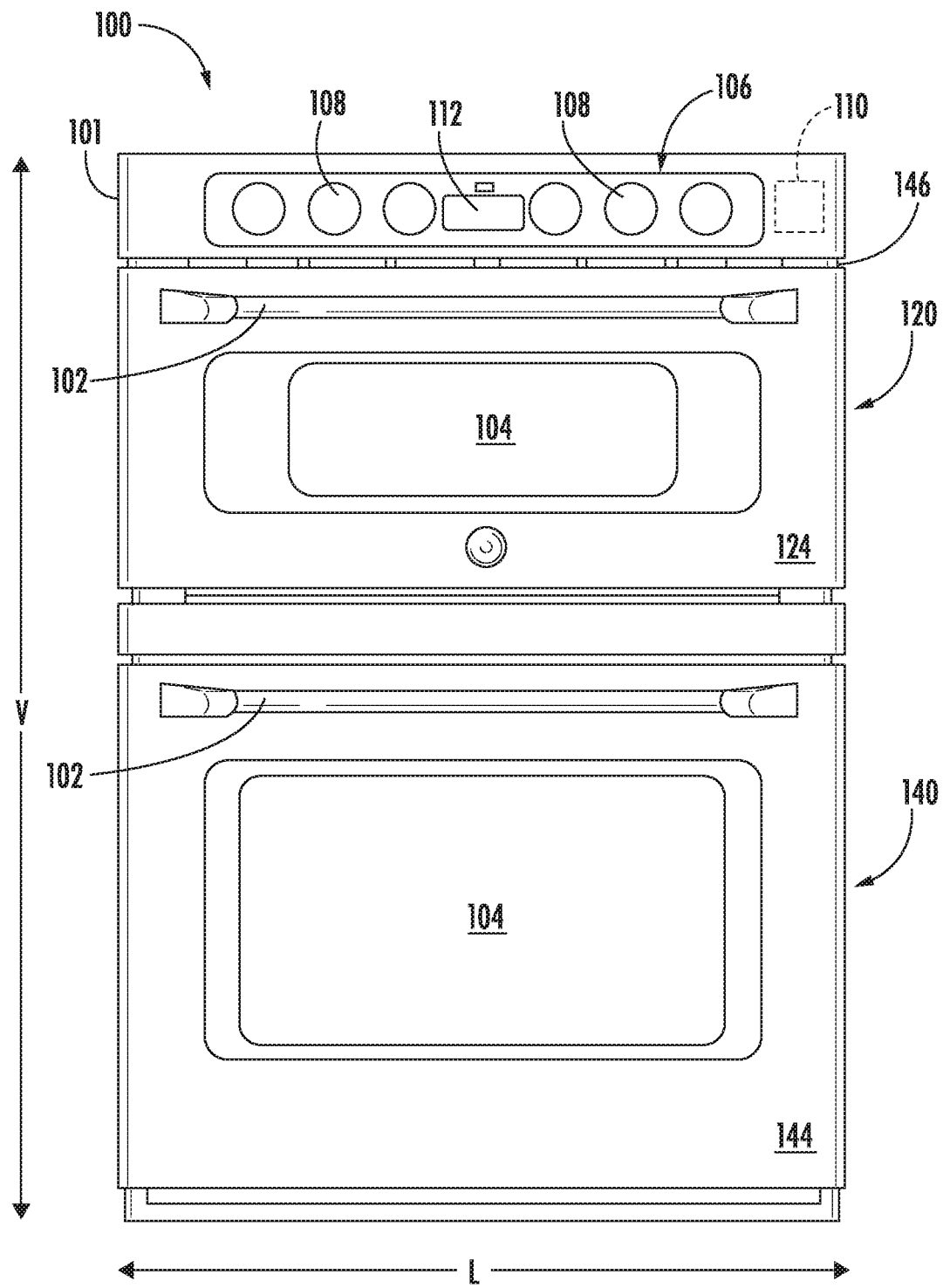
FIG. 1 provides an elevation view of an oven appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Referring now to the drawings, FIG. 1 illustrates an exemplary embodiment of a double oven appliance 10 according to the present disclosure.

Although aspects of the present subject matter are described herein in the context of a double oven appliance 100, it should be appreciated that oven appliance 100 is provided by way of example only. Other oven or range appliances having different configurations, different appearances, or different features may also be utilized with the present subject matter as well (e.g., single ovens, electric cooktop ovens, induction cooktops ovens, etc.).

Figure 2:
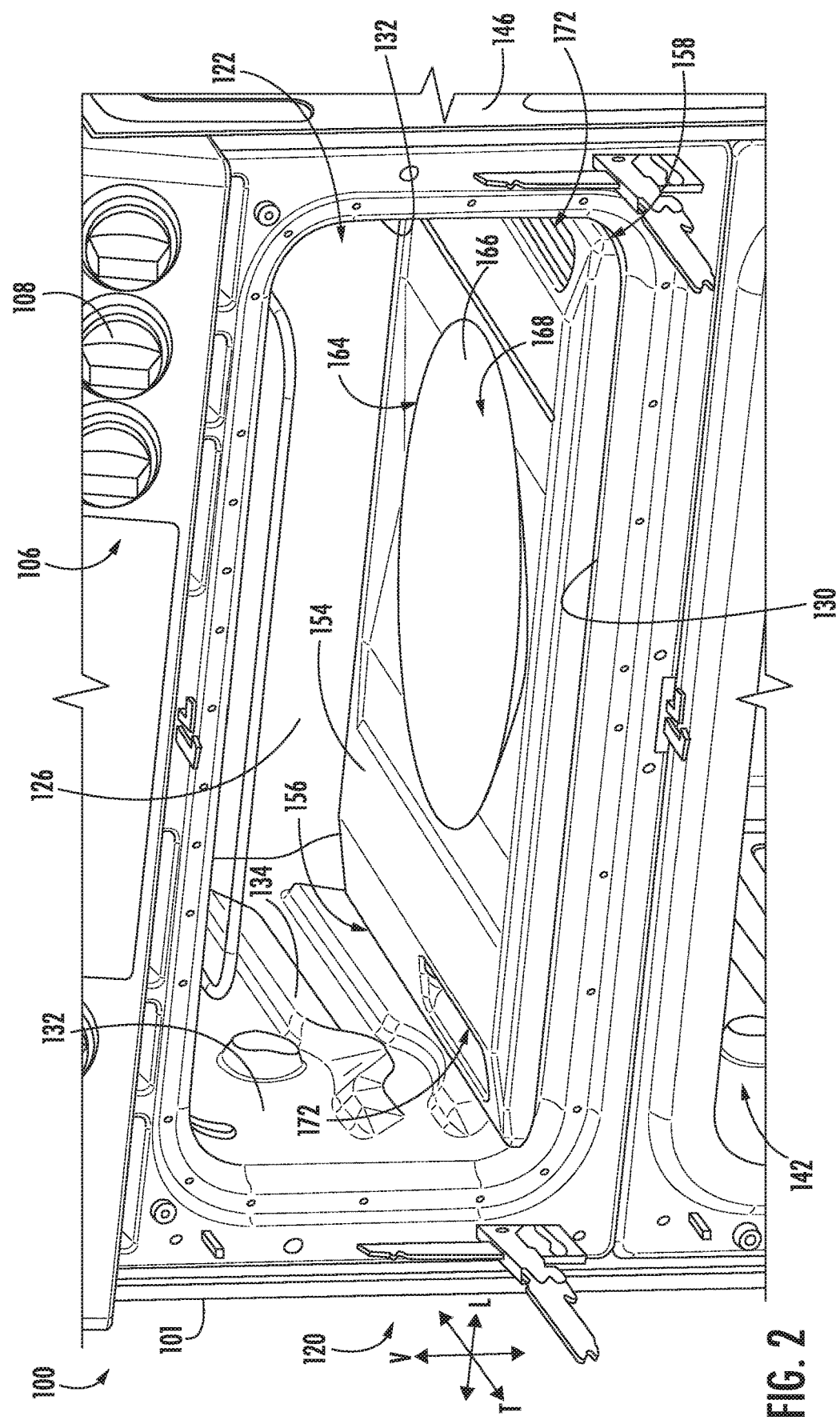
FIG. 2 provides a perspective view of an upper cooking chamber of the exemplary oven appliance of FIG. 1.
Figure 3:
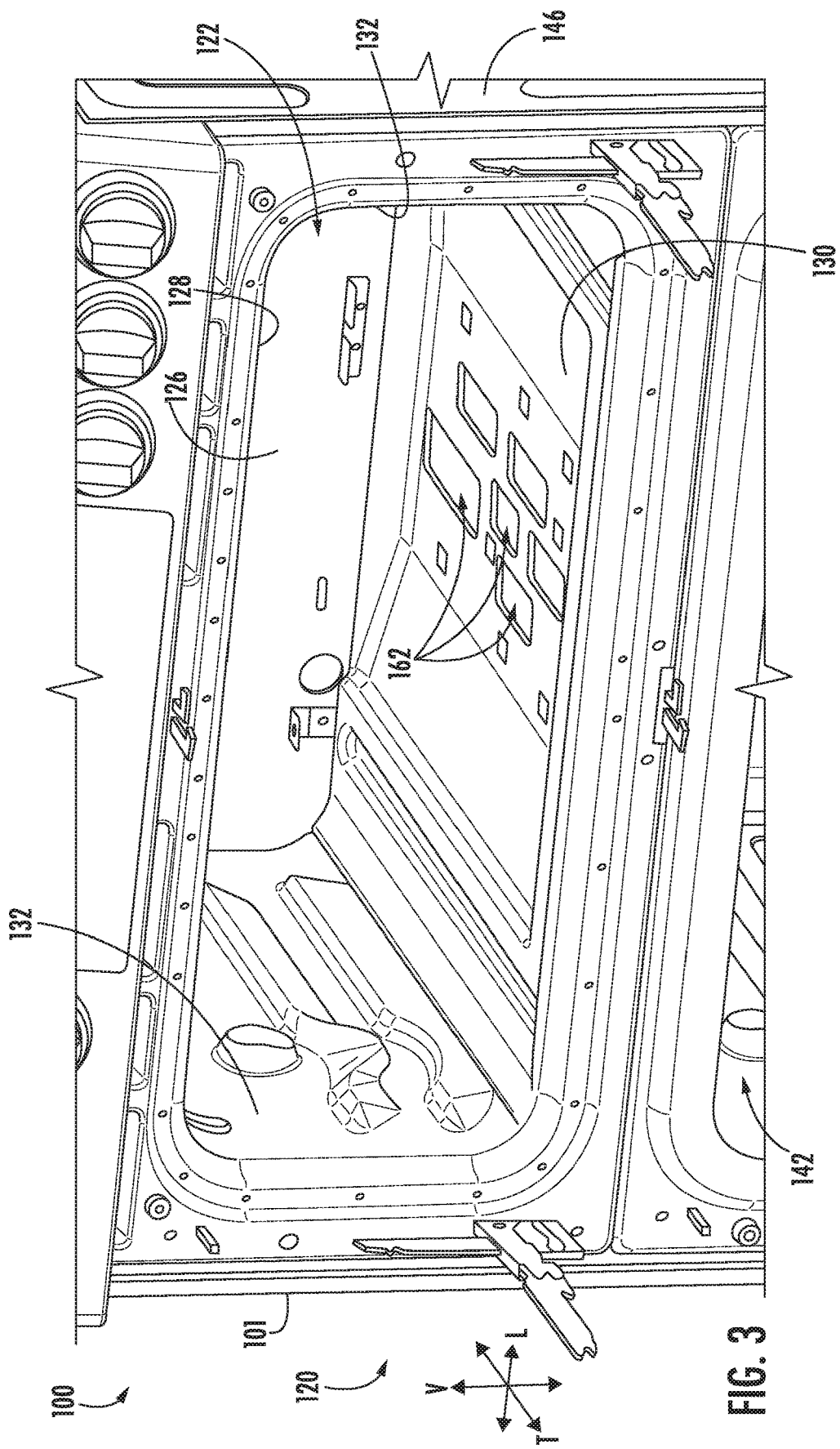
FIG. 3 provides a perspective view of the upper cooking chamber of the exemplary oven appliance of FIG. 1, wherein certain elements have been removed for clarity.
Figure 4:
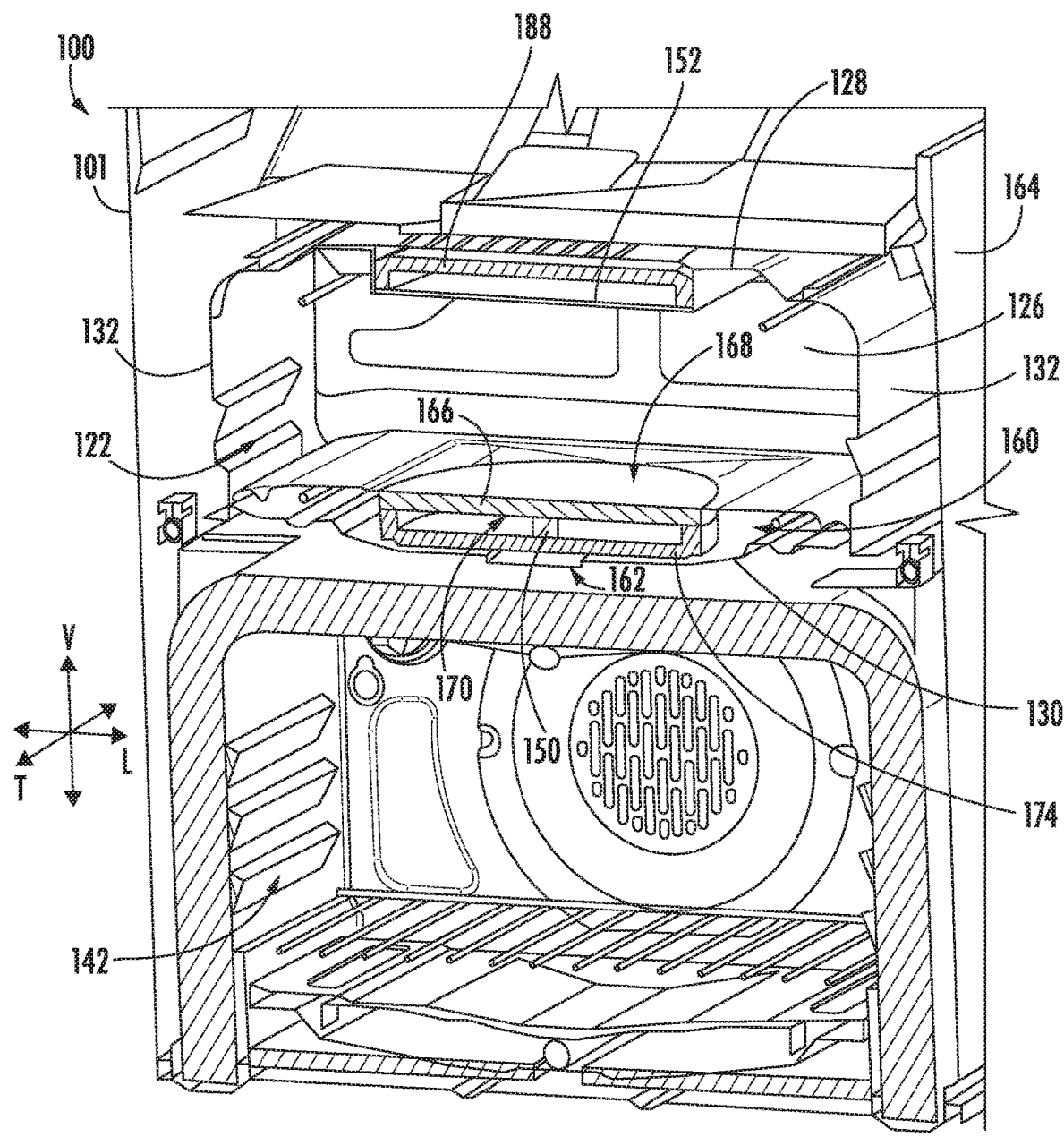
FIG. 4 provides a front, perspective, sectional view of a portion of the exemplary oven appliance of FIG. 1.
Figure 7:
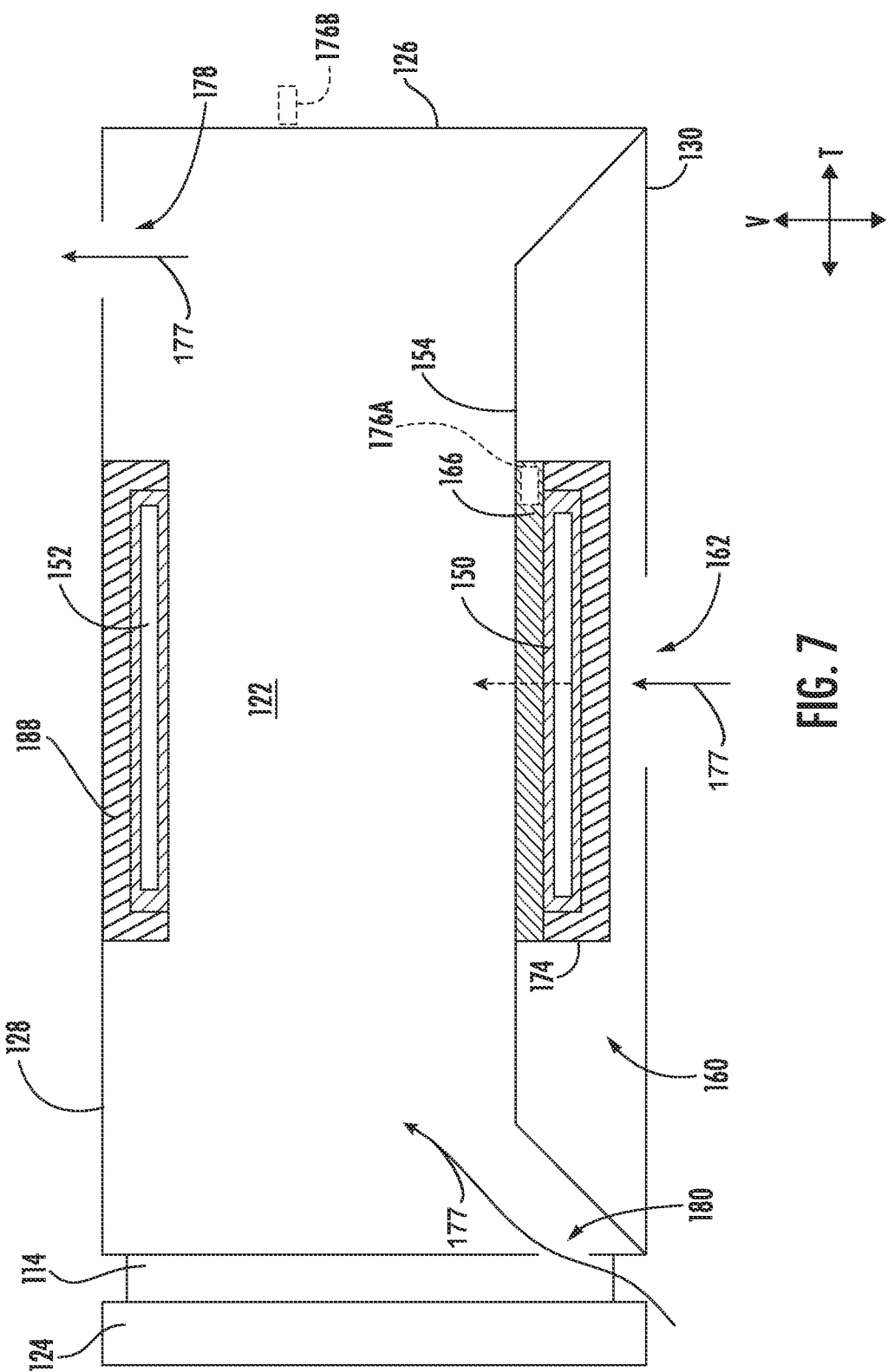
FIG. 7 provides a side, schematic elevation view of the upper cooking chamber of the exemplary oven appliance of FIG. 1.
Figure 8:
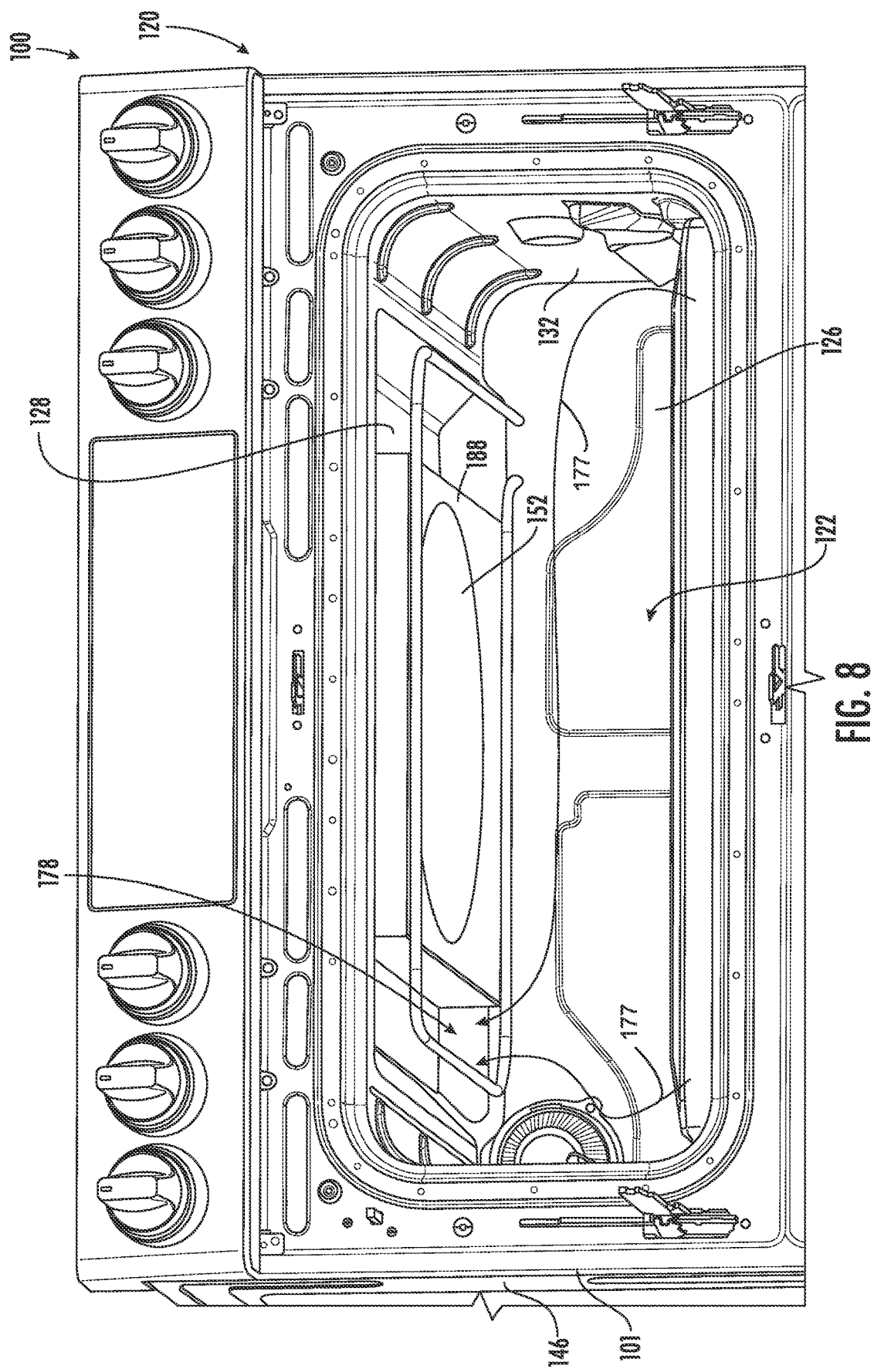
FIG. 8 provides a bottom, perspective view of the upper cooking chamber of the exemplary oven appliance of FIG. 1, wherein certain elements have been removed for clarity.
Figure 9:
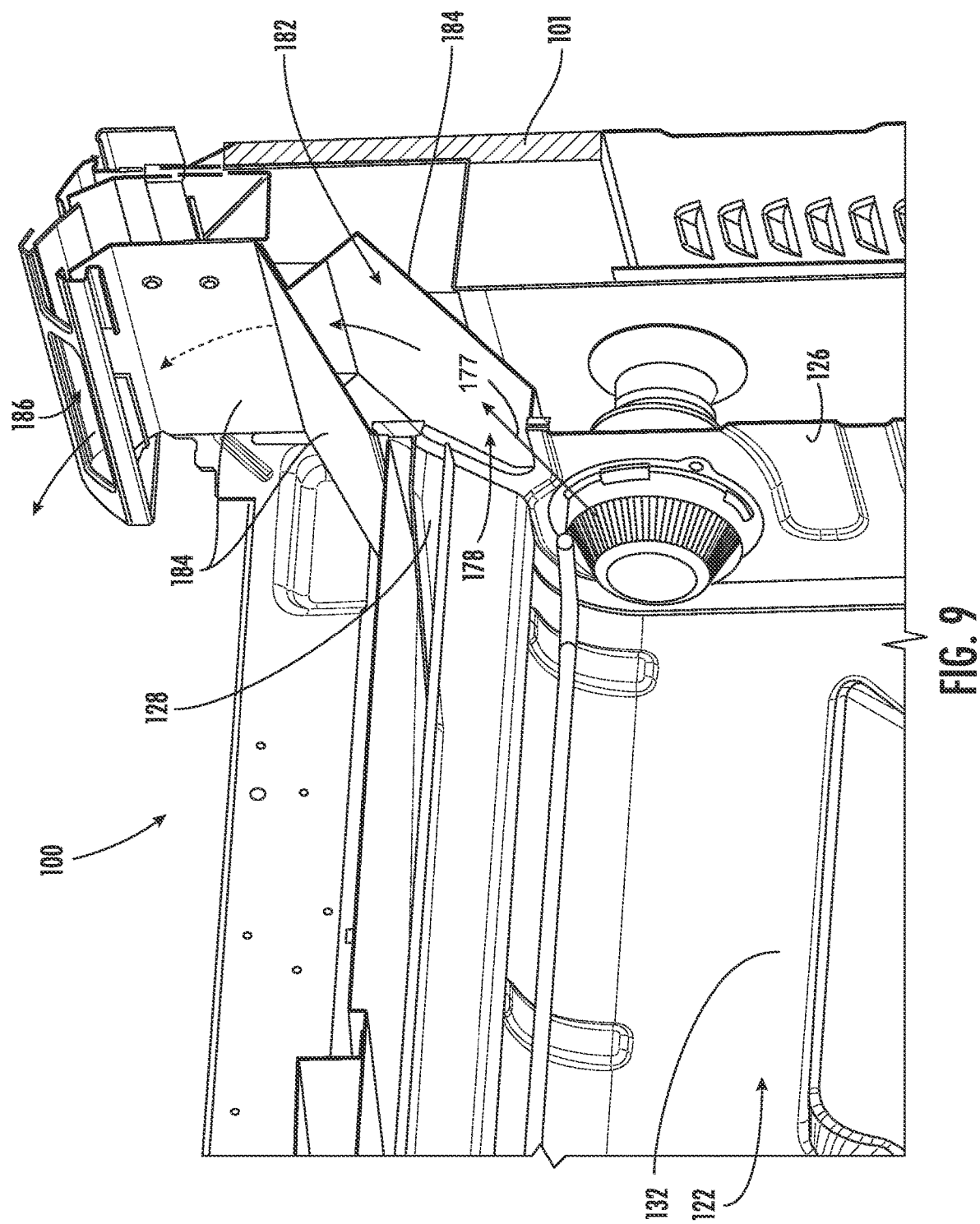
FIG. 9 provides a side, perspective, sectional view of a portion of the exemplary oven appliance of FIG. 1.

Generally, oven appliance 100 has a cabinet 101 defines a vertical direction V, a longitudinal direction L and a transverse direction T. The vertical, longitudinal and transverse directions are mutually perpendicular and form an orthogonal direction system. Double oven appliance 100 includes an upper oven 120 and a lower oven 140 positioned below upper oven 120 along the vertical direction V. Upper and lower ovens 120 and 140 include oven or cooking chambers 122 and 142, respectively, configured for the receipt of one or more food items to be cooked. Double oven appliance 100 includes an upper door 124 and a lower door 144 in order to permit selective access to cooking chambers 122 and 142, respectively. Handles 102 are mounted to upper and lower doors 124 and 144 to assist a user with opening and closing doors 124 and 144 in order to access cooking chambers 122 and 142. As an example, a user can pull on handle 102 mounted to upper door 124 to open or close upper door 124 and access cooking chamber 122. Glass windowpanes 104 provide for viewing the contents of cooking chambers 122 and 142 when doors 124, 144 are closed and also assist with insulating cooking chambers 122 and 142. Optionally, a seal or gasket (e.g., gasket 114—FIG. 7) extends between each door 124, 144 and cabinet 101 (e.g., when the corresponding door 124 or 144 is in the closed position). The gasket 114 may assist with maintaining heat and cooking fumes within the corresponding cooking chamber 122 or 142 when the door 124 or 144 is in the closed position. As illustrated further in FIGS. 2 and 3, heating elements, such as electric resistance heating elements, gas burners, microwave elements, etc., are positioned within upper and lower oven 120 and 140.

A control panel 106 of double oven appliance 100 provides selections for user manipulation of the operation of double oven appliance 100. For example, a user can touch control panel 106 to trigger one of user inputs 108. In response to user manipulation of user inputs 108, various components of the double oven appliance 100 can be operated. Control panel 106 may also include a display 112, such as a digital display, operable to display various parameters (e.g., temperature, time, cooking cycle, etc.) of the double oven appliance 100.

Figure 5:
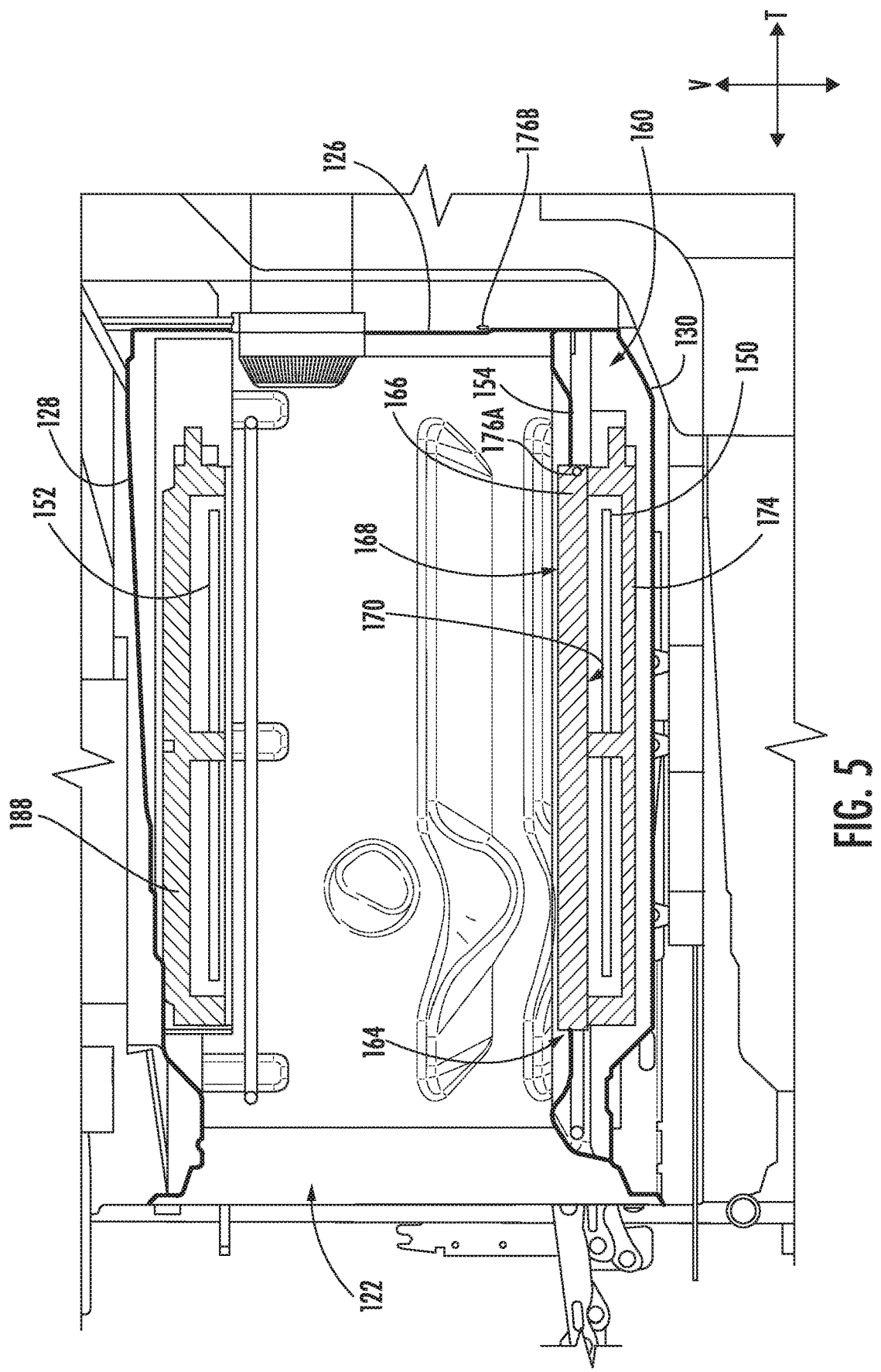
FIG. 5 provides a side sectional view of the upper cooking chamber of the exemplary oven appliance of FIG. 1.

Generally, oven appliance 100 may include a controller 110 in operative communication (e.g., operably coupled via a wired or wireless channel) with control panel 106. Control panel 106 of oven appliance 100 may be in communication with controller 110 via, for example, one or more signal lines or shared communication busses, and signals generated in controller 110 operate oven appliance 100 in response to user input via user input devices 108. Input/Output ("I/O") signals may be routed between controller 110 and various operational components of oven appliance 100 such that operation of oven appliance 100 can be regulated by controller 110. In addition, controller 110 may also be communication with one or more sensors, such as a first temperature sensor (TS1) 176A or a second temperature sensor (TS2) 176B (FIG. 5). Generally, either or both TS1 176A and TS2 176B may include or be provided as as a thermistor or thermocouple, which may be used to measure temperature at a location proximate to upper cooking chamber 122 and provide such measurements to the controller 110. Although TS1 176A is illustrated within an enclosed region 160 proximate to bottom heating element 150 and TS2 176B is illustrated on a back wall 126 between top heating element 152 and bottom heating element 150, it should be appreciated that other sensor types, positions, and configurations may be used according to alternative embodiments.

Controller 110 is a "processing device" or "controller" and may be embodied as described herein. Controller 110 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 110 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 110 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Turning now to FIGS. 2 through 9, various views are provided illustrating, in particular, upper cooking chamber 122 of upper oven 120. As shown, upper cooking chamber 122 is generally defined by a back wall 126, a top wall 128 and a bottom wall 130 spaced from top wall 128 along the vertical direction V by opposing side walls 132 (e.g., a first wall and a second wall). In some embodiments opposing side walls 132 include embossed ribs 134 such that a baking rack containing food items may be slidably received onto embossed ribs 134 and may be moved into and out of upper cooking chamber 122 when door 124 is open. Optionally, such walls 126, 128, 130, 132 may be included within an outer casing 146 of cabinet 101, as is understood.

As shown, upper oven 120 includes one or more heating elements to heat upper cooking chamber 122 (e.g., as directed by controller 110 as part of a cooking operation). For instance, a bottom heating element 150 may be mounted at a bottom portion of upper cooking chamber 122 (e.g., above bottom wall 130). Additionally or alternatively, a top heating element 152 may be mounted at a top portion of upper cooking chamber 122 (e.g., below top wall 128). Bottom heating element 150 and top heating element 152 may be used independently or simultaneously to heat upper cooking chamber 122, perform a baking or broil operation, perform a cleaning cycle, etc.

The heating elements 150, 152 may be provided as any suitable heater for generating heat within upper cooking chamber 122. For instance, either heating element may include an electric heating element (e.g., resistance wire elements, radiant heating element, electric tubular heater or CALROD®, halogen heating element, etc.). Additionally or alternatively, either heating element may include a gas burner.

As shown, a base panel 154 may be provided within upper cooking chamber 122 (e.g., fixedly mounted or, alternatively, removably mounted). Within upper cooking chamber 122, base panel 154 is generally disposed over the bottom wall 130. In some embodiments, base panel 154 extends laterally between a first end 156 and a second end 158. As shown, the first end 156 may be attached to bottom wall 130 at one lateral side (e.g., proximal to first side wall 132) while second end 158 is attached to bottom wall 130 at the opposite lateral side (e.g., proximal to second side wall 132). Although base panel 154 may be mounted to bottom wall 130, at least a portion of base panel 154 is vertically spaced apart from bottom wall 130. In some embodiments, an enclosed region 160 is defined between base panel 154 and bottom wall 130. For instance, enclosed region 160 may be defined as an air gap between a lower surface 170 of base panel 154 and an upper surface of base panel 154. Base panel 154 may include or be formed from any suitable material (e.g., a first material) for enduring the high-heat environment of upper cooking chamber 122, such as steel.

In certain embodiments, bottom wall 130 defines one or more cavity vents 162. Such cavity vents 162 may be upstream from the enclosed region 160. For instance, cavity vents 162 may be defined below base panel 154 such that air 177 is permitted to flow through bottom wall 130 (e.g., from a surrounding or ambient environment) to enclosed region 160. Optionally, cavity vents 162 may extend along the vertical direction V. Additionally or alternatively, one or more inlets defined by or through cabinet 101 or door upstream of cavity vent 162. During use, ambient air (e.g., outside of oven appliance 100) may be permitted through the inlets and to the enclosed region 160 through the cavity vents 162.

In some embodiments, base panel 154 defines a receiving zone 164 within which a cooking plate 166 is disposed (e.g., fixedly mounted or, alternatively, removably mounted). For instance, cooking plate 166 may be held or embedded within a hole or recess defining receiving zone 164. Optionally, one or more support tabs may be included within receiving zone 164 (e.g., beneath cooking plate 166) to hold cooking plate 166 to base panel 154. Generally, cooking plate 166 may provide an upper cooking surface 168 on which a food item (e.g., bread or pizza) may be received. Cooking plate 166 may be provided as a solid-nonpermeable member or, alternatively, define one or more apertures through which air may pass. In some embodiments, cooking plate 166 includes or is formed from a heat-retaining material, such as clay, stone (e.g., cordierite), ceramic, cast iron, or ceramic-coated carbon steel. In additional or alternative embodiments, cooking plate 166 includes a separate material (e.g., second material) from base panel 154.

Although shown as defining circular upper surface, it is understood that cooking plate 166 may be formed as any suitable shape on which food items may be supported.

Within the enclosed region 160 (e.g., below the receiving zone 164 or cooking plate 166), bottom heating element 150 may be enclosed or covered by base panel 154. Bottom heating element 150 may be disposed below the lower surface 170 of base panel 154. The enclosed region 160 may thus be defined about bottom heating element 150. During use, heat generated at bottom heating element 150 may be directed upward to a lower surface 170 of base panel 154 or cooking plate 166. In some embodiments, bottom heating element 150 is vertically aligned with (e.g., directly beneath) the receiving zone 164 or cooking plate 166. The heat generated at bottom heating element 150 may thus be guided primarily or initially to the underside of the receiving zone 164 or cooking plate 166.

Separate from receiving zone 164, base panel 154 may define one or more oven vents 172. Such oven vents 172 may extend through base panel 154 (e.g., from an upper surface to a lower surface 170). Specifically, oven vents 172 may extend to the enclosed region 160. When assembled, the oven vents 172 may be in fluid communication with (e.g., downstream from) the enclosed region 160. Air may thus pass between the enclosed region 160 and the oven vents 172. During certain operations, air may be routed out of the enclosed region 160 through the oven vents 172. For instance, air may be routed to the surrounding, upper portion of upper cooking chamber 122 or to an ambient environment outside of upper cooking chamber 122. The oven vents 172 may be directed away from the receiving zone 164 or cooking plate 166 (e.g., radially or laterally outward toward side walls 132 or back wall 126). Air from the oven vents 172 may thus be motivated (e.g., by natural or fan-forced convection) into the upper portion of upper cooking chamber 122 from the enclosed region 160 without directly flowing to the upper surface of cooking plate 166—and any food items thereon.

In optional embodiments, multiple oven vents 172 are defined by base panel 154 and spaced apart from each other (e.g., along the lateral direction L). Two or more oven vents 172 may be defined at opposite sides of cooking plate 166. For instance, a first oven vent 172 may be defined at a first lateral side of base panel 154 while a second oven vent 172 is defined at a second lateral side of base panel 154. The first oven vent 172 may be directed outward toward the first side wall 132. The second oven vent 172 may be directed outward toward the second side wall 132. During use, heated air within the enclosed region 160 may thus be evenly distributed through the upper cooking chamber 122 without flowing directly to the receiving zone 164 between the first and second oven vents 172.

In certain embodiments, a bottom insulator plate 174 is provided below the bottom wall 130 along the vertical direction. Specifically, at least a portion of bottom insulator plate 174 is disposed below bottom heating element 150. As an example, bottom insulator plate 174 may be included with or as part of a support dish in which bottom heating element 150 is housed and supported (e.g., within enclosed region 160). Bottom insulator plate 174 may surround bottom heating element 150, while defining a top opening to direct heat from bottom heating element 150 upward (e.g., to receiving zone 164 or cooking plate 166). As an additional or alternative example, bottom insulator plate 174 may include a stand-alone plate vertically aligned below bottom heating element 150 such that bottom heating element 150 is disposed between an upper surface of bottom insulator plate 174 and a lower surface 170 of bottom wall 130. In optional embodiments, bottom insulator plate 174 is disposed above one or more cavity vents 162. For instance, bottom insulator plate 174 may be vertically aligned within cavity vents 162 and downstream therefrom.

Bottom insulator plate 174 may be formed from or include any suitable low thermal conductivity material such as a metal or ceramic (e.g., ceramic fiber) insulation. Additionally or alternatively, bottom insulator plate 174 may be formed from or include any suitable reflector plate or heat shield material (e.g., metal, such as stainless steel, aluminized steel, etc.) such that bottom insulator plate 174 acts as a heat shield redirecting heat upward from bottom insulator plate 174. During use, bottom insulator plate 174 may generally block heat from being transmitted (e.g., downward) from bottom heating element 150. Air (e.g., ambient air) may flow to and across bottom insulator plate 174 from cavity vents 162 within enclosed region 160. Such air may provide further cooling for bottom insulator plate 174. Moreover, at least a portion of the cooling air may flow from bottom insulator plate 174, through enclosed region 160, and from one or more oven vents 172.

Separate from or in addition to the cooling air through enclosed region 160, a front inlet 180 may be defined through a door 124 or outer wall of cabinet 101 to upper cooking chamber 122. For instance, front inlet 180 may be defined as an air gap between door 124 or gasket 114 and a front face of cabinet 101. In certain embodiments, gasket 114 is positioned at the air gap or front inlet 180. During use, front inlet 180 may be upstream from upper cooking chamber 122. Thus, when door 124 is in the closed position, gasket 114 may generally extend across the air gap or front inlet 180 between door 124 and cabinet 101 such that air is permitted to pass from the ambient environment, through front inlet 180, and to upper cooking chamber 122 (e.g., as motivated by natural or forced convection).

One or more temperature sensors (e.g., TS1 176A) may be disposed within the enclosed region 160, for instance, to detect the temperature of bottom heating element 150 or cooking plate 166. Optionally, TS1 176A may be mounted between the bottom heating element 150 and the cooking plate 166. In some embodiments, a TS1 176A is mounted to cooking plate 166. As an example, TS1 176A may be disposed on a bottom surface of cooking plate 166 (e.g., via a mechanical fastener, clip, or hook). As an additional or alternative example, TS1 176A may be held within a recess in cooking plate 166. As an additional or alternative example, TS1 176A may be embedded within cooking plate 166.

Additionally or alternatively, one or more temperature sensors (e.g., TS2 176B) may be disposed within the cabinet 101 proximate to cooking chamber 122 and above cooking surface 168, for instance, to detect the (e.g., general or diffuse) temperature of cooking chamber 122 between cooking plate 166 and below top heating element 152. Optionally, TS2 176B may be mounted between the top heating element 152 and the cooking plate 166 (e.g., above TS1 176A). In some embodiments, TS2 176B is mounted to a chamber wall. Specifically, TS2 176B may be laterally positioned between the side walls 132 or vertically positioned between the top wall 128 and bottom wall 130. As an example, TS2 176B may be disposed on back wall 126 (e.g., via a mechanical fastener, clip, or hook). As an additional or alternative example, TS2 176B may be held within a recess in back wall 126. As an additional or alternative example, TS2 176B may be embedded within back wall 126.

When assembled, the temperature sensor(s) 176A, 176B may be operably coupled to controller 110. Moreover, the controller 110 may be configured to control top heating element 152 or bottom heating element 150 based on the temperature detected at the temperature sensor(s) 176A, 176B (e.g., as part of a cooking operation, such as a short-cycle cooking operation). In some embodiments, a cooking operation initiated by the controller 110 may thus include detecting one or more temperatures of TS1 176A and TS2 176B, and directing heat output from (e.g., a heat setting of) top heating element 152 or bottom heating element 150 based on the detected temperature.

Figure 6:
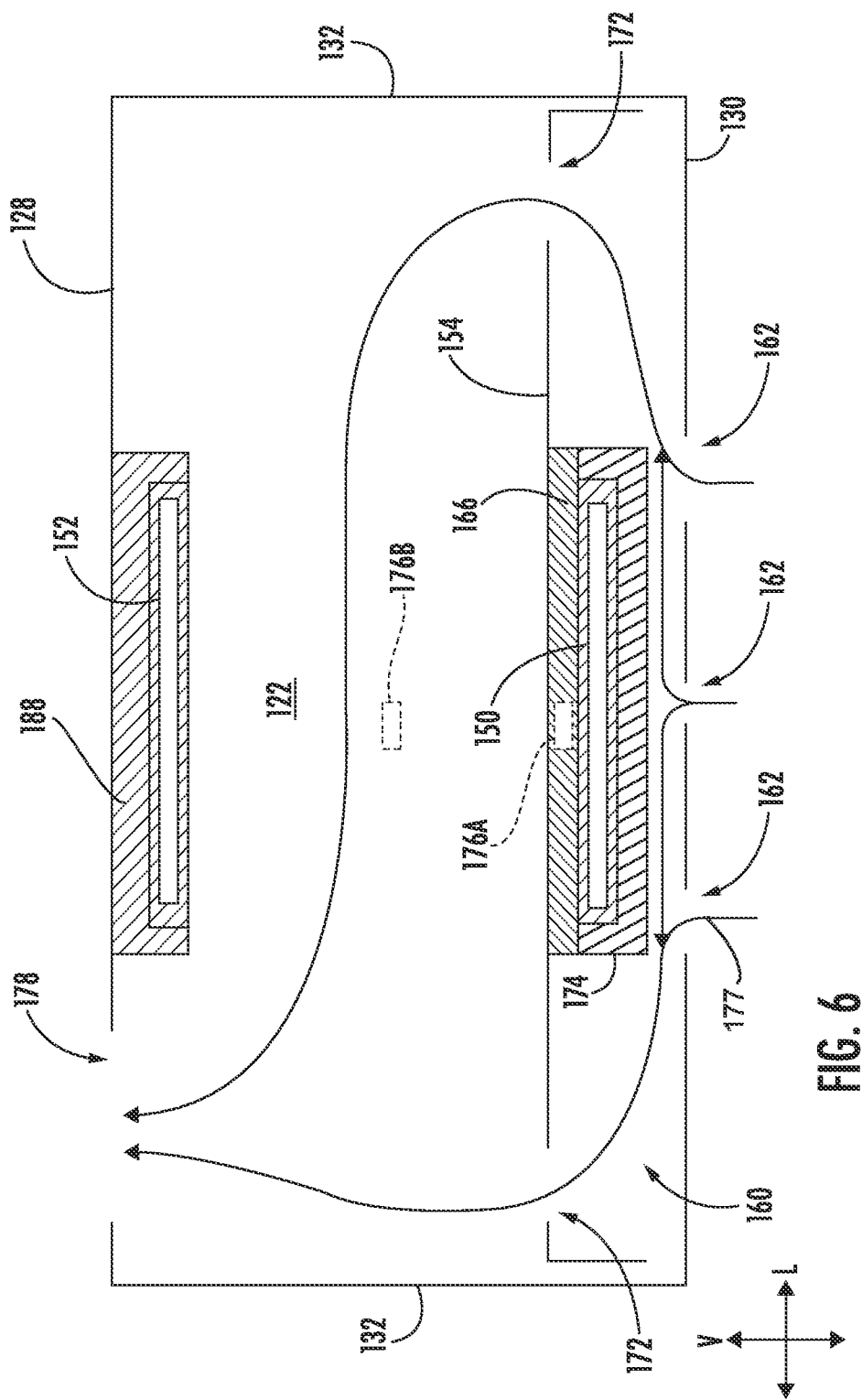
FIG. 6 provides a front, schematic elevation view of the upper cooking chamber of the exemplary oven appliance of FIG. 1.
Figure 10:
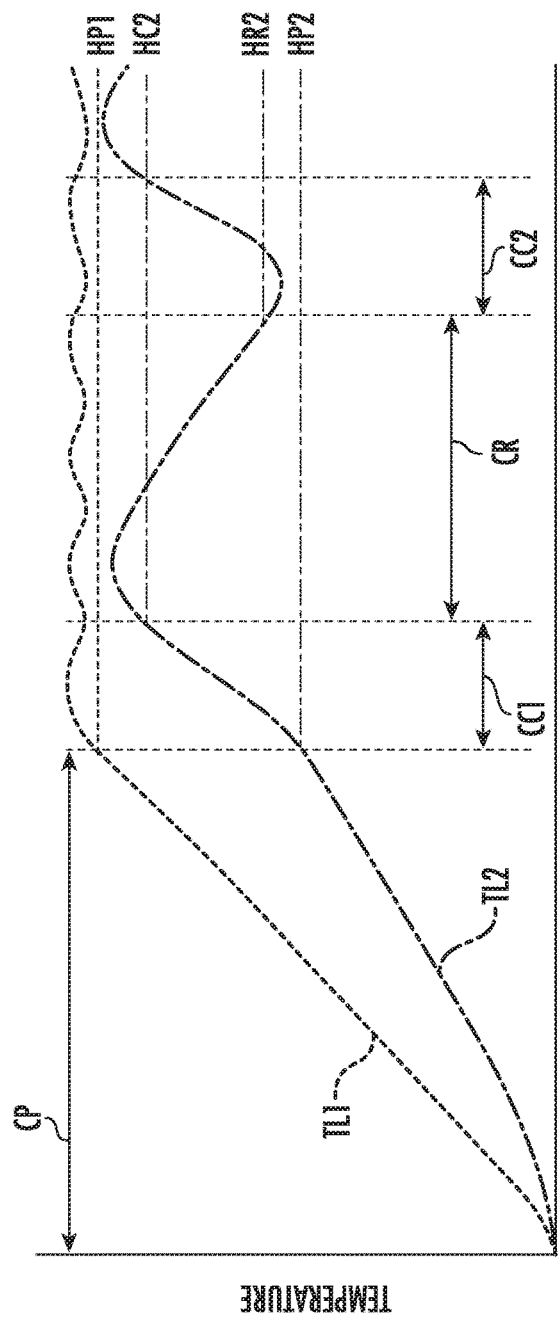
FIG. 10 is a graph view illustrating temperature over time for two discrete temperature sensors within an oven appliance during a high-heat cooking operation according to exemplary embodiments of the present disclosure.
Figure 11:
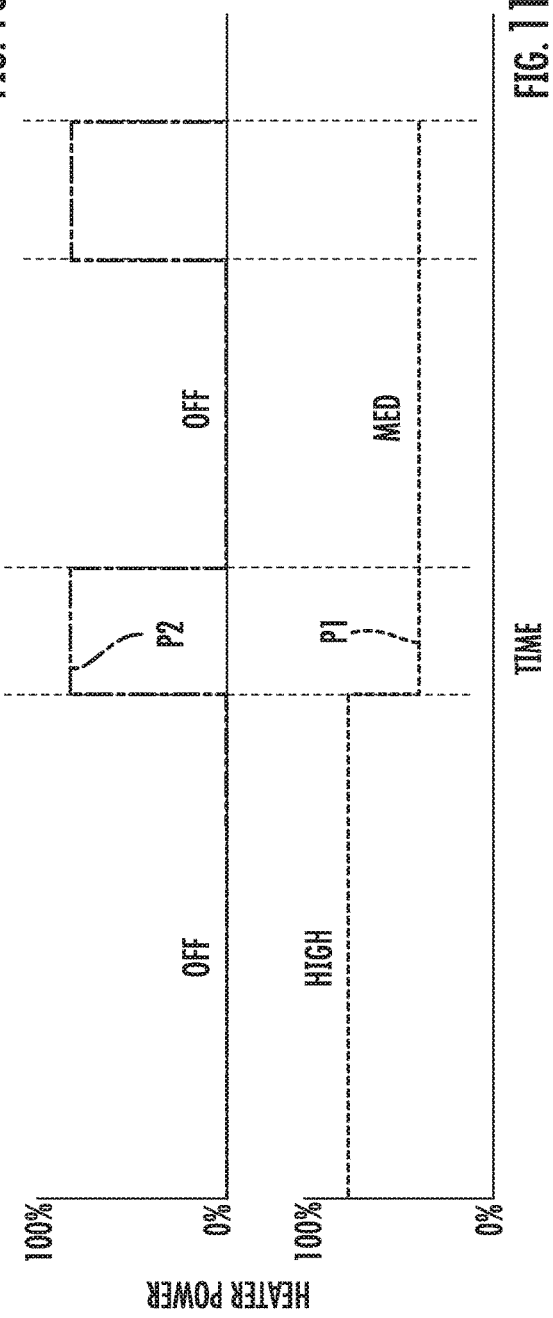
FIG. 11 is a graph view illustrating power output over time for two discrete heaters within an oven appliance during the exemplary high-heat cooking operation of FIG. 10.

As an example, and turning briefly to FIGS. 10 and 11, graphs are provided to illustrate a short-cycle cooking operation directed by controller 110 (FIG. 1) in operative communication with the heating elements 150, 152 (FIG. 6) and temperature sensors 176A, 176B (FIG. 6). In particular, FIG. 10 provides a graph of temperature lines TL1, TL2 detected at TS1 176A and TS2 176B, respectively. FIG. 11 provides a graph of output line P1, P2 for power output as a percentage of maximum output (e.g., as dictated by a duty cycle or TRIAC) at bottom heating element 150 and top heating element 152, respectively. As shown, the cooking operation may include a preheat cycle CP in which the bottom heater output P1 is set at a relatively high output setting (e.g., between 80% and 100%) while the top heater output P2 is restricted (e.g., at 0%). Generally, during the preheat cycle CP, temperature (e.g., as measured along TL1 and TL2) increases within the oven chamber until a preheat threshold is met. For instance, the preheat cycle CP may continue until a first sensor preheat threshold HP1 is met or exceeded (e.g., at TL1) or a second preheat threshold HP2 is met or exceeded (e.g., at TL2). Thus, the temperature sensors TS1 and TS2 may have discrete preheat thresholds. Either preheat threshold HP1 or HP2 being met may, in turn, halt the preheat cycle CP. Advantageously, the cooking plate 166 or surface 168 within the cooking chamber 122 may be brought to a relatively high temperature without reaching excessive or undesirable temperatures within the rest of cooking chamber 122.

Following the preheat cycle CP (e.g., immediately thereafter), a first cooking cycle CC1 may be initiated in which the bottom heater output P1 is set at a cooking output setting (e.g., medium output setting between 40% and 80%) while the top heater output P2 is set at a relatively high output setting (e.g., between 80% and 100%). The temperature at or measured along TL1 may remain relatively constant as the temperature at or measured along TL2 rises rapidly. The cooking cycle CC1 may continue until a restriction condition occurs. Optionally, the restriction condition may be determination that a cooking threshold HC2 (e.g., at TL2) is met or exceeded. Alternatively, the restriction condition may be another expiration condition (e.g., expiration of a predetermined high-output time period following the start of the cooking cycle CC1).

Following the first cooking cycle CC1 (e.g., immediately thereafter), a restricted cycle CR may be initiated in which the bottom heater output P1 is set at a cooking output setting (e.g., the same or different setting as the first cooking cycle CC1, such as an output setting between 10% and 80%) while the top heater output P2 is restricted (e.g., at 0%). The temperature at or measured along TL1 may remain relatively constant as the temperature at or measured along TL2 reduces. The restricted cycle CR may continue until a permissive condition. Optionally, the permissive condition may be a determination that a restriction lower limit HR2 (e.g., at TL2) is met or surpassed (i.e., TL2 has been reached or has fallen below HR2). Alternatively, the permissive condition may be another expiration condition (e.g., expiration of a predetermined cool-down time period following the start of the restricted cycle CR). Notably, in practice, the duration of the restricted cycle CR may be less than the duration of the preheat cycle CP. Advantageously, excessive heat may be prevented from accumulating within the cooking chamber 122, generally, while maintaining the cooking plate 166 or surface 168 at a relatively high temperature (e.g., for cooking additional or successive food items).

Following the restricted cycle CR (e.g., immediately thereafter), a second or additional cooking cycle CC2 may be initiated, similar to the first cooking cycle CC1. Subsequently, additional restriction cycles and cooking cycles may be performed, as would be understood (e.g., until a user deactivates the cooking appliance 100 or otherwise stops the cooking operation altogether).

Figure 12:
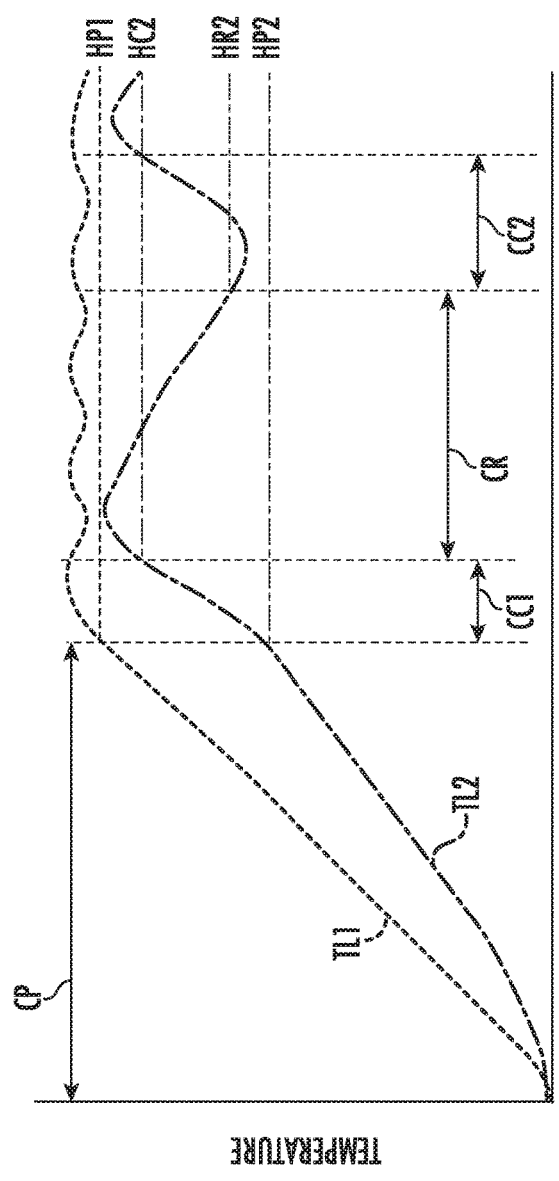
FIG. 12 is a graph view illustrating a temperature over time for two discrete temperature sensors within an oven appliance during a high-heat cooking operation according to exemplary embodiments of the present disclosure.
Figure 13:
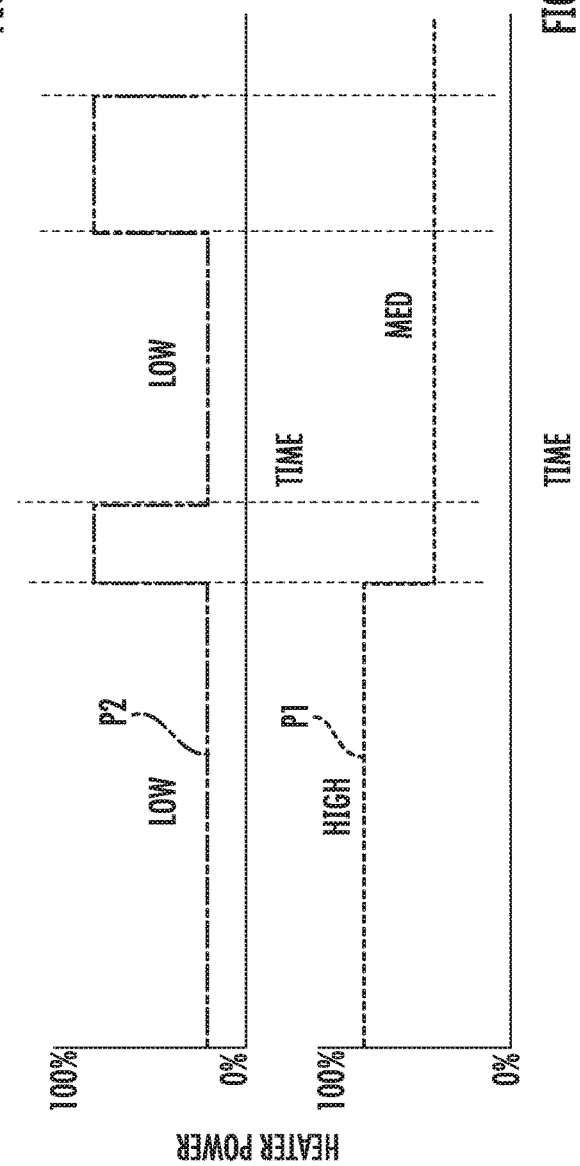
FIG. 13 is a graph view illustrating power output over time for two discrete heaters within an oven appliance during the exemplary high-heat cooking operation of FIG. 12.

As another example, and turning briefly to FIGS. 12 and 13, graphs are provided to illustrate another short-cycle cooking operation directed by controller 110 (FIG. 1) in operative communication with the heating elements 150, 152 (FIG. 6) and temperature sensors 176A, 176B (FIG. 6). In particular, FIG. 12 provides a graph of temperature lines TL1, TL2 detected at TS1 176A and TS2 176B, respectively. FIG. 13 provides a graph of output line P1, P2 for power output as a percentage of maximum output (e.g., as dictated by a duty cycle or TRIAC) at bottom heating element 150 and top heating element 152, respectively. As shown, the cooking operation may include a preheat cycle CP in which the bottom heater output P1 is set at a relatively high output setting (e.g., between 80% and 100%) while the top heater output P2 is set at a relatively low output setting (e.g., between 10% and 40%). Generally, during the preheat cycle CP, temperature (e.g., as measured along TL1 and TL2) increases within the oven chamber until a preheat threshold is met. For instance, the preheat cycle CP may continue until a first sensor preheat threshold HP1 is met or exceeded (e.g., at TL1) or a second preheat threshold HP2 is met or exceeded (e.g., at TL2). Thus, the temperature sensors TS1 and TS2 may have discrete preheat thresholds. Either preheat threshold HP1 or HP2 being met may, in turn, halt the preheat cycle CP. Advantageously, the cooking plate 166 or surface 168 within the cooking chamber 122 may be brought to a relatively high temperature without reaching excessive or undesirable temperatures within the rest of cooking chamber 122.

Following the preheat cycle CP (e.g., immediately thereafter), a first cooking cycle CC1 may be initiated in which the bottom heater output P1 is set at a cooking output setting (e.g., medium output setting between 40% and 80%) while the top heater output P2 is set at a relatively high output setting (e.g., between 80% and 100%). The temperature at or measured along TL1 may remain relatively constant as the temperature at or measured along TL2 rises rapidly. The cooking cycle CC1 may continue until a restriction condition occurs. Optionally, the restriction condition may be determination that a cooking threshold HC2 (e.g., at TL2) is met or exceeded. Alternatively, the restriction condition may be another expiration condition (e.g., expiration of a predetermined high-output time period following the start of the cooking cycle CC1).

Following the first cooking cycle CC1 (e.g., immediately thereafter), a restricted cycle CR may be initiated in which the bottom heater output P1 is set at a cooking output setting (e.g., the same or different setting as the first cooking cycle CC1, such as an output setting between 10% and 80%) while the top heater output P2 set at a relatively low output setting (e.g., between 10% and 40%). The temperature at or measured along TL1 may remain relatively constant as the temperature at or measured along TL2 reduces. The restricted cycle CR may continue until a permissive condition. Optionally, the permissive condition may be a determination that a restriction lower limit HR2 (e.g., at TL2) is met or surpassed (i.e., TL2 has been reached or has fallen below HR2). Alternatively, the permissive condition may be another expiration condition (e.g., expiration of a predetermined cool-down time period following the start of the restricted cycle CR). Notably, in practice, the duration of the restricted cycle CR may be less than the duration of the preheat cycle CP. Advantageously, excessive heat may be prevented from accumulating within the cooking chamber 122, generally, while maintaining the cooking plate 166 or surface 168 at a relatively high temperature (e.g., for cooking additional or successive food items).

Following the restricted cycle CR (e.g., immediately thereafter), a second or additional cooking cycle CC2 may be initiated, similar to the first cooking cycle CC1. Subsequently, additional restriction cycles and cooking cycles may be performed, as would be understood (e.g., until a user deactivates the cooking appliance 100 or otherwise stops the cooking operation altogether).

Returning generally to FIGS. 1 through 9, in certain embodiments, one or more exhaust openings 178 are defined through the chamber walls. Specifically, an exhaust opening 178 may be defined proximal to top wall 128 (i.e., closer to top wall 128 than bottom wall 130 along the vertical direction V). For instance, at least one chamber wall (e.g., top wall 128 or back wall 126) may define an exhaust opening 178 downstream from the oven vent 172. In some embodiments, exhaust opening 178 is spaced apart from top heating element 152 (e.g., horizontally, such as along the lateral direction L or transverse direction T). Relatively hot air aligned between the heating elements 150, 152 may be drawn away from the region between the heating elements 150, 152, advantageously preventing or reducing the concentration of heat within upper cooking chamber 122 (e.g., even during operations in which upper cooking surface 168 is heated to relatively high temperatures, such as those above 250° or 315° Celsius).

When assembled, the exhaust opening 178 may communicate with the ambient environment about oven appliance 100. In some such embodiments, cabinet 101 defines an exhaust channel 182 that extends from the upstream exhaust opening 178 to a downstream exhaust port 186. As shown, one or more internal guide walls 184 may define exhaust channel 182 outside of upper cooking chamber 122.

In some embodiments, exhaust port 186 is defined, above top wall 128. Additionally or alternatively, exhaust port 186 may be defined proximal to or rearward from back wall 126. By placing exhaust port 186 in a top, back corner of cabinet 101, hot air may be exhausted up and away from both oven appliance 100 and its user. Alternatively, exhaust port 186 may be defined in a rear outer panel of cabinet 101, such that it is not visible to the user, or may be positioned at any other suitable location. Additionally or alternatively, exhaust port 186 may be coupled to an exhaust duct which routes heated air out of the room in which oven appliance 100 is located.

During use, air, gas, or fumes within the upper cooking chamber 122, including at least a portion of air from the enclosed region 160, may exit upper cooking chamber 122 downstream through exhaust opening 178, exhaust channel 182, and exhaust port 186. As is understood, the air through exhaust opening 178 may be motivated by natural convection or by forced convection from an included oven fan (not pictured) that is, for example, mounted within exhaust channel 182.

As noted above, top heating element 152 may be mounted above the bottom heating element 150 to heat upper cooking chamber 122. In certain embodiments, a top insulator plate 188 is mounted between top heating element 152 and top wall 128 (e.g., along the vertical direction V) within upper cooking chamber 122. Specifically, at least a portion of top insulator plate 188 is disposed above top heating element 152. As an example, top insulator plate 188 may be included with or as part of a support dish (e.g., open support dish) in which top heating element 152 is housed and supported. Top insulator plate 188 may surround top heating element 152, while defining a bottom opening to direct heat from top heating element 152 downward (e.g., to upper cooking chamber 122 or in the general direction of cooking plate 166). As an additional or alternative example, top insulator plate 188 may include a stand-alone plate vertically aligned above top heating element 152 such that top heating element 152 is disposed between a bottom surface of top insulator plate 188 and upper cooking chamber 122. Optionally, top insulator plate 188 may form an open cavity such that heat may flow directly downward from top heating element 152 to a lower portion of upper cooking chamber 122.

Top insulator plate 188 may be formed from or include any suitable low thermal conductivity material such as a ceramic (e.g., ceramic fiber) insulation. Additionally or alternatively, top insulator plate 188 may be formed from or include any suitable reflector plate or heat shield material (e.g., metal, such as stainless steel, aluminized steel, etc.) such that top insulator plate 188 acts as a heat shield redirecting heat downward from top heating element 152. During use, top insulator plate 188 may generally block heat from being transmitted (e.g., upward) from top heating element 152. Air may flow to and across top insulator plate 188 from upper cooking chamber 122 and to exhaust opening 178.

Figure 14:
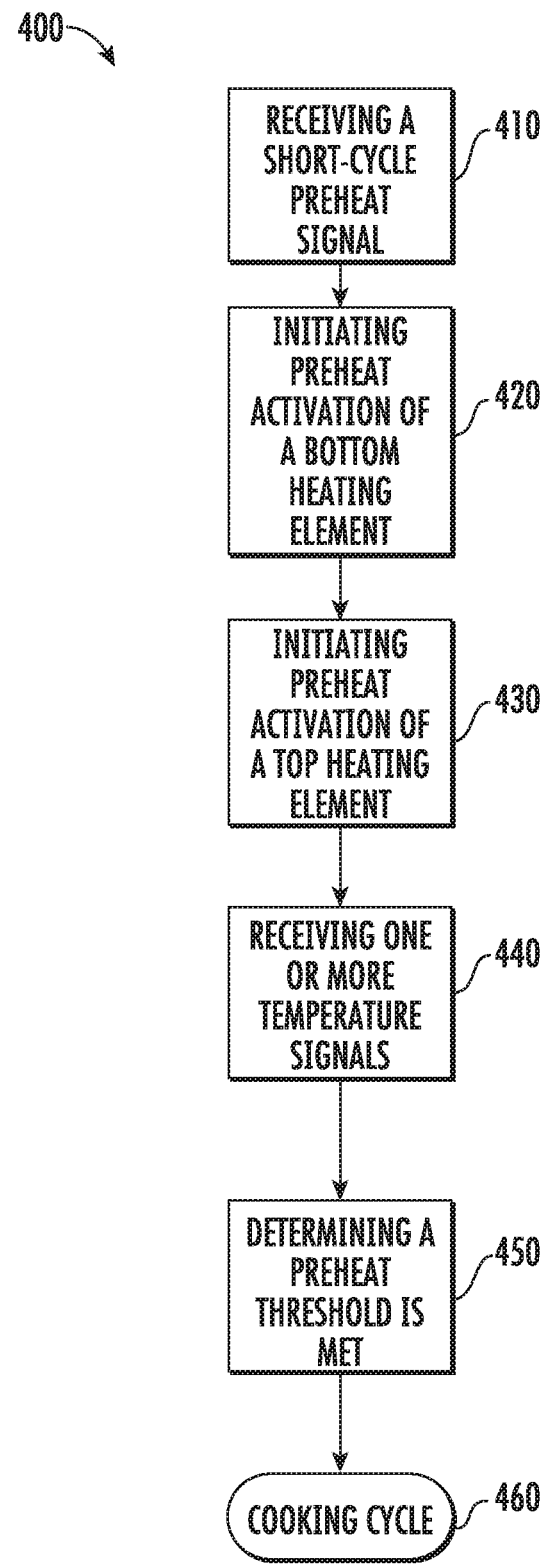
FIG. 14 is a flow chart illustrating of method of operating an oven appliance according to exemplary embodiments of the present disclosure.
Figure 15:
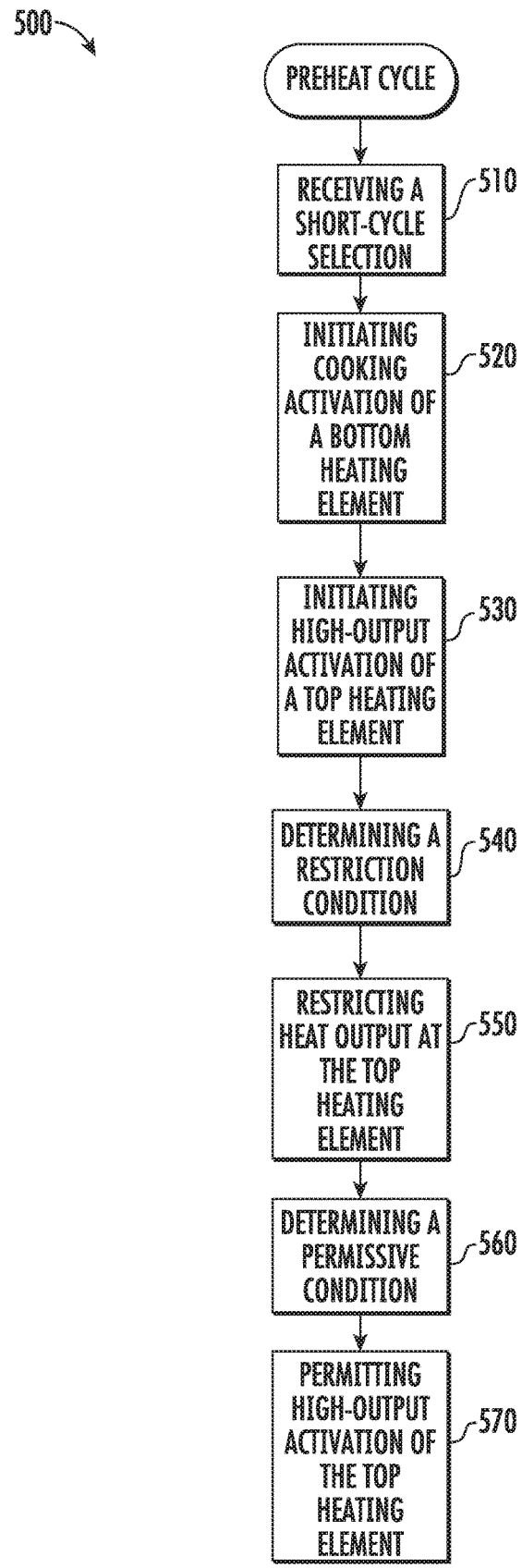
FIG. 15 is a flow chart illustrating of method of operating an oven appliance according to exemplary embodiments of the present disclosure.

Referring now to FIGS. 14 and 15, the present disclosure may further be directed to methods (e.g., method 400 or 500) of operating an oven appliance, such as appliance 100. In exemplary embodiments, the controller 110 may be operable to perform various steps of a method in accordance with the present disclosure.

The methods (e.g., 400 or 500) may occur as, or as part of, a cooking operation (e.g., short-cycle cooking operation) of oven appliance 100. In particular, the methods (e.g., 400 or 500) disclosed herein may advantageously facilitate a cooking plate or surface within a cooking chamber to be brought to a relatively high temperature without reaching excessive or undesirable temperatures within the rest of the cooking chamber. Additionally or alternatively, the methods (e.g., 400 or 500) may advantageously permit multiple cooking cycles to be performed in relatively quick succession (e.g., without requiring deactivation of all heating elements or significant cooling of the cooking chamber).

It is noted that the order of steps within methods 400 and 500 are for illustrative purposes. Moreover, neither method 400 nor 500 is mutually exclusive. In other words, methods within the present disclosure may include either or both of methods 400 and 500. Both may be adopted or characterized as being fulfilled in a common operation. Except as otherwise indicated, one or more steps in the below method 400 or 500 may be changed, rearranged, performed in a different order, or otherwise modified without deviating from the scope of the present disclosure.

Turning especially to FIG. 14, at 410, the method 400 includes receiving a short-cycle preheat signal. Generally, the short-cycle preheat signal may indicate that a short-cycle or localized, high-heat cooking operation is planned (e.g., by a user). For instance, the short-cycle preheat signal may correspond to a user input (e.g., at the control panel). Thus, user engagement of a short-cycle button or input at the control panel may transmit the short-cycle preheat signal to the controller.

At 420, the method 400 includes initiating preheat activation of the bottom heating element (e.g., in response to 410). Specifically, preheat activation of the bottom heating element may be initiated as part of a preheat cycle of the oven appliance. In some embodiments, 420 includes turning on or otherwise increasing power or fuel to the bottom heating element (e.g., from 0%). For instance, the bottom heating element may be activated according to a predetermined preheat power or heat output (e.g., as a percentage of maximum output as dictated by a duty cycle or TRIAC).

In certain embodiments, the predetermined preheat power output of the bottom heating element is a relatively high output setting (e.g., greater than 50%). Optionally, the predetermined preheat power output of the bottom heating element may be greater than 75%. Additionally or alternatively, the predetermined preheat power output of the bottom heating element may be between 80% and 100%.

Generally, once activated, the bottom heating element may be maintained in an active state in which power or fuel is directed to the bottom heating element to generate heat for the duration of the preheat cycle. For instance, the power or heat output of the bottom heating element may be maintained above 0% (e.g., at a directed duty cycle or constant output).

At 430, the method 400 includes initiating preheat activation of the top heating element during preheat activation of the bottom heating element. Specifically, preheat activation of the top heating element may be initiated as part of a preheat cycle of the oven appliance. Optionally, 430 may occur subsequent to 420 (e.g., according to a top heater delay in response to 410). Nonetheless, the bottom heating element and top heating element may be simultaneously active to generate heat during at least a portion of the preheat cycle. In some embodiments, 430 includes turning on or otherwise increasing power or fuel to the top heating element (e.g., from 0%). For instance, the top heating element may be activated according to a predetermined preheat power or heat output (e.g., as a percentage of maximum output as dictated by a duty cycle or TRIAC).

In certain embodiments, the predetermined preheat power output of the top heating element is a relatively low output setting (e.g., less than 50%). Optionally, the predetermined preheat power output of the top heating element may be less than 45%. Additionally or alternatively, the predetermined preheat power output of the top heating element may be between 10% and 40%.

Generally, once activated, the top heating element may be maintained in an active state in which power or fuel is directed to the top heating element to generate heat for at least a portion of the duration of the preheat cycle (e.g., the remaining duration of the preheat cycle following 430). For instance, the power or heat output of the top heating element may be maintained above 0% (e.g., at a directed duty cycle or constant output).

At 440, the method 400 includes receiving one or more temperature signals from a first temperature sensor (e.g., TS1) and a second temperature sensor (e.g., TS2). In other words, 440 includes receiving one or more (e.g., first) temperature signals from the first temperature sensor and receiving one or more (e.g., second) temperature signals from the second temperature sensor (e.g., separately from or simultaneously to the temperature signals from the first temperature sensor), as described above. The temperature signals of 440 may be received during the preheat cycle. In certain embodiments, 440 occurs during preheat activation of the bottom heating element and the top heating element. Thus, multiple measurements may be obtained for the cooking chamber during the preheat cycle.

At 450, the method 400 includes determining a preheat threshold is met based on the received one or more temperature signals. Determination of the preheat threshold being met may, for example, generally indicate the completion of the preheat cycle or that the desired conditions for cooking have been generally met. In some embodiments, the preheat threshold may be met when a temperature signal from the first temperature sensor or the second temperature sensor is greater than the corresponding sensor threshold.

As described above, each temperature sensor may have a discrete temperature threshold (e.g., sensor preheat threshold). For instance, the first temperature sensor may have a first sensor threshold while the second temperature sensor has a second sensor threshold. Thus, 450 may include comparing a first temperature signal (from TS1) to a first temperature threshold and comparing a second temperature signal (from TS2) to a second temperature threshold. Optionally, the second temperature threshold may be less than the first threshold.

Either temperature threshold being exceeded may occur for 450. Thus, 450 may include determining a first sensor temperature signal (from TS1) is greater than the first sensor threshold while (e.g., further determining) a second sensor temperature signal (from TS2) is less than or equal to the second sensor threshold. Alternatively, 450 may include determining a first sensor temperature signal (from TS1) is less than or equal to the first sensor threshold while (e.g., further determining) a second sensor temperature signal (from TS2) is greater than the second sensor threshold. If conditions arise in which temperature signals from both temperature sensors are greater than their respective preheat thresholds, the method 400 may include determining (e.g., based on the above-described comparisons) the first in time of the first sensor temperature signal exceeding the first sensor threshold and the second sensor temperature signal exceeding the second sensor threshold. In some such embodiments, 450 may thus be based on the determined first in time of the first sensor temperature signal exceeding the first sensor threshold and the second sensor temperature signal exceeding the second sensor threshold. In other words, the preheat threshold may be determined to be met as soon as it is determined that either sensor threshold is exceeded.

Optionally, absent any further instructions (e.g., to initiate a cooking cycle), the preheat conditions may be maintained within the cooking chamber (e.g., for a predetermined period of time following 450 according to a feedback loop).

At 460, the method 400 includes directing the heating elements according to a cooking cycle following (i.e., subsequent to) 450. In particular, 460 may include directing the bottom heating element and the top heating element, as described above.

In some embodiments, 460 includes initiating activation of the bottom heating element and initiating high-output activation of the top heating element (e.g., as described above). For instance, the bottom heating element may be activated at a cooking output setting (e.g., medium output setting between 40% and 80%) while the top heating element is activated at a relatively high output setting (e.g., between 80% and 100%). After the cooking cycle begins and the high-output activation of the top heating element, 460 may include determining a restriction condition and restricting heat output at the top heating element in response to determining the restriction condition. Specifically, the top heating element may be restricted while maintaining activation of the bottom heating element. Optionally, the restriction condition may include expiration of a high-output period (e.g., between 2 minutes and 10 minutes, such as 4 minutes) from the start of the cooking cycle (e.g., initiating high-output activation of the top heating element). Additionally or alternatively, the restriction condition may include a cooking threshold being met (e.g., at TS2), as described above.

Turning especially to FIG. 15, at 510, the method 500 includes receiving a short-cycle selection signal (e.g., following a preheat cycle). Generally, the short-cycle selection signal may indicate that a short-cycle or localized, high-heat cooking operation is desired (e.g., by a user). For instance, the short-cycle selection signal may correspond to a user input (e.g., at the control panel). Thus, user engagement of a short-cycle button or input at the control panel may transmit the short-cycle selection signal to the controller.

At 520, the method 500 includes initiating cooking activation of the bottom heating element (e.g., in response to 510). Specifically, cooking activation of the bottom heating element may be initiated as part of a cooking cycle of the oven appliance. In some embodiments, 520 includes continuing or adjusting power or fuel to the bottom heating element (e.g., from a preheat activation). For instance, the bottom heating element may be kept in an active state following preheating, though the bottom heating element may be set to a predetermined cooking power or heat output may be different from the preheat power or heat output (e.g., as a percentage of maximum output as dictated by a duty cycle or TRIAC).

In certain embodiments, the predetermined cooking power output of the bottom heating element is a medium output setting (e.g., less than 80% or greater than 20%). Optionally, the predetermined cooking power output of the bottom heating element may be greater than 40%. Additionally or alternatively, the predetermined cooking power output may be less than 80%. Further additionally or alternatively, the predetermined cooking power output of the bottom heating element may be between 40% and 80%.

Generally, once activated, the bottom heating element may be maintained in an active state in which power or fuel is directed to the bottom heating element to generate heat for the duration of the cooking cycle. For instance, the power or heat output of the bottom heating element may be maintained above 0% (e.g., at a directed duty cycle or constant output). Optionally, the bottom heating element may be adjusted according to a cooking-cycle setpoint for TS1 (e.g., temperature feedback loop at which activation is adjusted to maintain the temperature at TS1 within a predetermined range of the setpoint, as would be understood). In some such embodiments, the cooking-cycle setpoint is equal to a (e.g., first sensor) preheat temperature threshold for TS1. Thus, during the cooking cycle, the bottom heating element may maintain the temperature measured at TS1 above the preheat threshold.

At 530, the method 500 includes initiating high-output activation of the top heating element during cooking activation of the bottom heating element. Specifically, high-output activation of the top heating element may be initiated as part of the cooking cycle. Optionally, 530 may occur subsequent to 520 (e.g., according to a top heater delay in response to 510). Alternatively, 530 may occur simultaneously to 520 (e.g., in response to 510). Generally, the bottom heating element and top heating element may be simultaneously active to generate heat during at least a portion of the cooking cycle. In some embodiments, 530 includes turning on or otherwise increasing power or fuel to the top heating element (e.g., from 0% or a preheat output setting). For instance, the top heating element may be activated according to a predetermined high-output cooking power or heat output (e.g., as a percentage of maximum output as dictated by a duty cycle or TRIAC).

In certain embodiments, the predetermined high-output cooking power output of the top heating element is a relatively high output setting (e.g., greater than 50%). Optionally, the predetermined high-output cooking power output of the top heating element may be greater than 75%. Additionally or alternatively, the predetermined high-output cooking power output of the top heating element may be between 80% and 100%.

Generally, once activated, the top heating element may be maintained in an active state in which power or fuel is directed to the top heating element to generate heat for at least a portion of the duration of the cooking cycle (e.g., until 550, as described above). For instance, the power or heat output of the top heating element may be maintained above 0% (e.g., at a directed duty cycle or constant output).

At 540, the method 500 includes determining a restriction condition following (i.e., subsequent to) 530. As an example, 540 may include determining expiration of a high-output period following the start of the cooking cycle (e.g., demarcated or prompted at 510, 520, or 530). Optionally, the high-output period may be a period of time between 2 minutes and 10 minutes. Additionally or alternatively, the high-output period may be between 2 minutes and 4 minutes. As an additional or alternative example, 540 may include determining a cooking threshold is met (e.g., at TS2), as described above. Optionally, the cooking threshold may be a temperature threshold of TS2 that is greater than a preheat threshold of TS2.

At 550, the method 500 includes restricting heat output at the top heating element in response to determining the restriction condition at 540. Specifically, heat output of the top heating element is restricted while the bottom heating element is active for the cooking cycle (e.g., during cooking activation of the bottom heating element). Restricting heat output may require deactivating the top heating element (i.e., directing the heat output to 0%) or activating the top heating element according to a predetermined low-output cooking power or heat output (e.g., between 10% and 40%).

At 560, the method 500 includes determining a permissive condition following (i.e., subsequent to) 550. Generally, the permissive condition may indicate increased heat from the top heating element may be appropriate. As an example, 560 may include determining a cool-down or restriction period (e.g., measured in minutes) has ended following the start of 550. As an additional or alternative example, 560 may include determining a restriction lower limit is met (e.g., at TS2), as described above. Optionally, the bottom heating element may be maintained in an active state during 560.

At 570, the method 500 includes permitting high-output activation (e.g., reactivation) of the top heating element in response to 560. For instance, 570 may permit a return to 530 such that initiating activation of the heating elements for subsequent cooking cycles and determinations of restriction periods may be repeated, as would be understood (e.g., until the cooking operation is ultimately halted by a user or internal mechanism).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an oven appliance comprising a plurality of chamber walls mounted within a cabinet and defining an oven chamber, a cooking surface defined in the oven chamber between a bottom wall and a top wall of the plurality of chamber walls, a bottom heating element mounted above the bottom wall to heat the cooking surface, and a top heating element mounted above the cooking surface to heat the oven chamber, the method comprising:
   receiving one or more temperature signals from a first temperature sensor at the cooking surface and a second temperature sensor mounted above the first temperature sensor;
   initiating cooking activation of the bottom heating element;
   initiating high-output activation of the top heating element during cooking activation of the bottom heating element;
   determining a restriction condition subsequent to initiating high-output activation of the top heating element, wherein determining the restriction condition comprises determining expiration of a high-output period of at least two minutes; and
   restricting, in response to determining the restriction condition, heat output at the top heating element during cooking activation of the bottom heating element.

2. The method of claim 1, wherein initiating activation of the bottom heating element and initiating high-output activation of the top heating element is subsequent to directing a preheat cycle, wherein directing the preheat cycle comprises
   initiating preheat activation of the bottom heating element,
   receiving one or more temperature signals from the first temperature sensor at the cooking surface and the second temperature sensor mounted above the first temperature sensor, receiving occurring during preheat activation of the bottom heating element and preheat activation of the top heating element, and
   determining a preheat threshold is met based on the received one or more temperature signals.

3. The method of claim 1, wherein determining the restriction condition comprises determining expiration of a high-output period.

4. The method of claim 1, wherein restricting heat output at the top heating element comprises halting activation of the top heating element.

5. The method of claim 1, wherein restricting heat output at the top heating element comprises initiating low-temperature activation of the top heating element.

6. The method of claim 1, further comprising:
   determining, subsequent to restricting heat output, a permissive condition comprising expiration of a restriction period; and
   permitting high-output activation of the top heating element in response to determining the permissive condition.

7. The method of claim 1, further comprising:
   determining, subsequent to restricting heat output, a permissive condition comprising a determining a restriction lower limit is met at the second temperature sensor; and
   permitting high-output activation of the top heating element in response to determining the permissive condition.

8. A method of operating an oven appliance comprising a plurality of chamber walls mounted within a cabinet and defining an oven chamber, a cooking surface defined in the oven chamber between a bottom wall and a top wall of the plurality of chamber walls, a bottom heating element mounted above the bottom wall to heat the cooking surface, and a top heating element mounted above the cooking surface to heat the oven chamber, the method comprising:
   receiving one or more temperature signals from a first temperature sensor at the cooking surface and a second temperature sensor mounted above the first temperature sensor;
   initiating cooking activation of the bottom heating element;
   initiating high-output activation of the top heating element during cooking activation of the bottom heating element;
   determining a restriction condition subsequent to initiating high-output activation of the top heating element, wherein determining the restriction condition comprises determining expiration of a high-output period between two and ten minutes; and
   restricting, in response to determining the restriction condition, heat output at the top heating element during cooking activation of the bottom heating element.

9. A method of operating an oven appliance comprising a plurality of chamber walls mounted within a cabinet and defining an oven chamber, a cooking surface defined in the oven chamber between a bottom wall and a top wall of the plurality of chamber walls, a bottom heating element mounted above the bottom wall to heat the cooking surface, and a top heating element mounted above the cooking surface to heat the oven chamber, the method comprising:
   initiating preheat activation of the bottom heating element;
   initiating preheat activation of the top heating element during preheat activation of the bottom heating element;
   receiving one or more temperature signals from a first temperature sensor at the cooking surface and a second temperature sensor mounted above the first temperature sensor, receiving occurring during the preheat activation of the bottom heating element and the preheat activation of the top heating element;
   determining a preheat threshold is met based on the received one or more temperature signals; and
   directing the bottom heating element and the top heating element according to a cooking cycle subsequent to determining the preheat threshold is met, wherein directing the bottom heating element and the top heating element according to the cooking cycle comprises
      initiating cooking activation of the bottom heating element,
      initiating high-output activation of the top heating element,
      determining a restriction condition subsequent to initiating high-output activation of the top heating element, wherein determining the restriction condition comprises determining expiration of a high-output period of at least two minutes, and
      restricting heat output at the top heating element while maintaining activation of the bottom heating element in response to determining the restriction condition.

10. The method of claim 9, wherein initiating preheat activation of the top heating element is during initiating preheat activation of the bottom heating element.

11. The method of claim 9, wherein determining the preheat threshold is met comprises
- determining a first sensor temperature signal from the first temperature sensor is greater than a first sensor threshold, and
- determining a second sensor temperature signal from the second temperature sensor is less than or equal to a second sensor threshold.

12. The method of claim 11, wherein the second sensor threshold is less than the first sensor threshold.

13. The method of claim 9, wherein determining the preheat threshold is met comprises
- determining a first sensor temperature signal from the first temperature sensor is less than or equal to a first sensor threshold, and
- determining a second sensor temperature signal from the second temperature sensor is greater than a second sensor threshold.

14. The method of claim 13, wherein the second sensor threshold is less than the first sensor threshold.

15. The method of claim 9, wherein the cooking surface is defined by a cooking plate disposed on a base panel within a receiving zone above the bottom wall, wherein first temperature sensor is mounted on the cooking plate, and wherein the second temperature sensor is mounted above the cooking surface.

16. The method of claim 9, wherein determining the restriction condition comprises determining a cooking threshold is met at the second temperature sensor.

* * * * *